Dec. 5, 1961     A. F. VAN ZEE     3,011,673
COMPOSITE GLASS ARTICLE AND METHOD OF MAKING THE SAME
Filed Oct. 16, 1959

INVENTOR.
ARTHUR F. VAN ZEE
BY
W. A. Schaich and Charles S. Lynch
ATTORNEYS 3,011,673
COMPOSITE GLASS ARTICLE AND METHOD
OF MAKING THE SAME
Arthur F. Van Zee, Toledo, Ohio, assignor to Owens-Illinois Glass Company, a corporation of Ohio
Filed Oct. 16, 1959, Ser. No. 846,964
4 Claims. (Cl. 220—2.1)

This invention relates to a glass seal consisting of (1) a vitreous (non-devitrifying) solder glass and (2) a devitrifying solder glass and the method of making the same. This invention also relates to composite articles and to the method of manufacturing said articles by bonding together elements having compatible thermal expansion characteristics by means of the aforementioned seal and has particular application to the bonding of glass elements to form cathode ray tubes such as television bulbs.

It is known in the art that a bond between glass articles may be effected by either a vitreous or devitrified solder glass. However, to the best of my knowledge the employment of a seal between edges of glass members consisting of contiguous or contacting layers of vitreous and devitrified solder glass wherein each of said contiguous layers is also in contact with the edges of the glass members, has not heretofore been successfully accomplished.

Accordingly it is an object of this invention to provide a seal for joining glass members which combines the best features of vitreous and devitrifying sealing glasses or solder glasses.

A further object of this invention is to provide a seal which inhibits the formation of stresses due to evacuation at high temperatures.

A further object of this invention is to provide a seal which may be reopened without the application of heat and its concomitant disadvantages.

These and other objects will be apparent from the description which follows.

The novel seal of this invention is made by the cold application of contacting layers of devitrifying solder glass and a vitreous solder glass to the edge of the glass member to be joined to the edge of a second glass member wherein each layer of devitrifying and vitreous glass will be continuous with the glass edges to be joined together. Upon more or less drying of the two layers on the glass member, the second glass member is brought into contact therewith and the glass members are then fired to a sufficient temperature so as to effect an integral bonding of the solder glass layers with the two glass members. This invention has particular application to the bonding together of the glass funnel and glass face members of television tubes.

In the accompanying drawing illustrative embodiments of the invention are presented.

Figure 1:
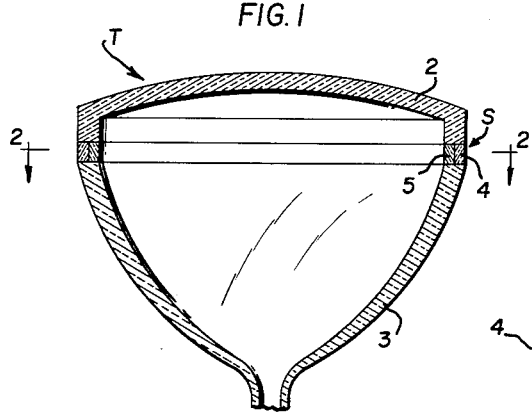
FIGURE 1 is a section through a television tube employing the glass seal of this invention consisting of a vitreous (non-devitrifying) solder glass and a devitrifying solder glass.
Figure 2:
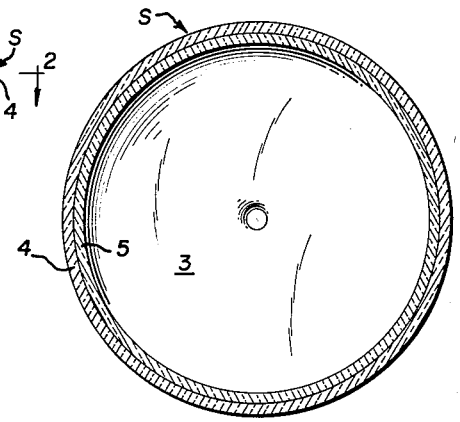
FIGURE 2 is a section 2—2 of FIGURE 1.
Figure 3:
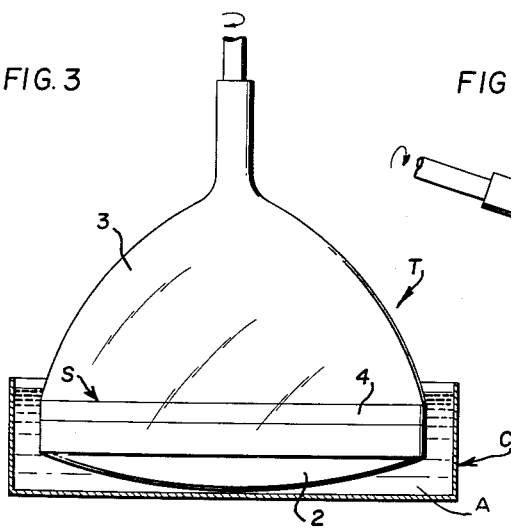
FIGURE 3 is a schematic view of an acid bath for treating the tube of FIGURE 1.
Figure 4:
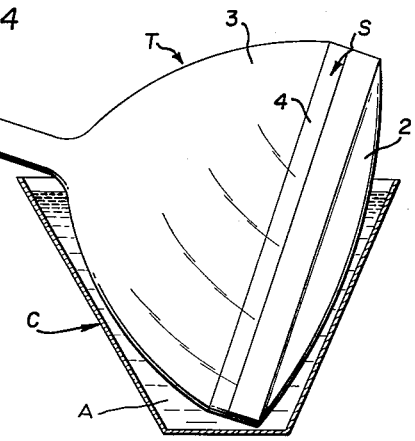
FIGURE 4 is a modification of FIGURE 3.
Figures 5, 6:
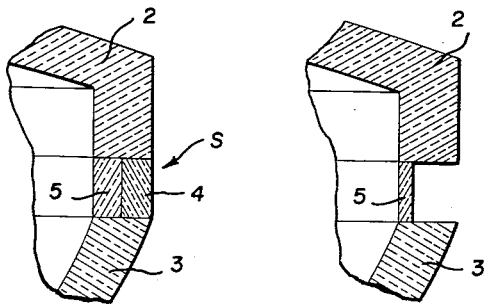
FIGURE 5 is an enlarged view of the juncture of the glass seal with the funnel and face plate of the television tube shown in FIGURE 1.
FIGURE 6 shows the changes which occur in FIGURE 5 after treatment of the television tube of FIGURE 1 in either the acid bath of FIGURE 3 or FIGURE 4.

In FIGURES 1, 2, 5, and 6 member T is a television tube consisting of a face plate 2 bonded to a funnel element 3 by a glass seal S consisting of a vitreous layer 5 and a devitrified layer 4. FIGURES 3 and 4 illustrate two modes of rotating the television tube T of this invention in a tank C containing an acid A for dissolving in part the glass seal S as shown in greater detail by FIGURES 5 and 6.

The present invention will be more completely understood by reference to the following examples. In each instance all parts and percentages are by weight unless otherwise specified.

EXAMPLE I

Suspensions of a powdered vitreous solder glass designated as V-4, described in Table II below, and a powdered devitrifying solder glass designated as D-2, described in Table I below, each in 1½ percent nitrocellulose in amyl acetate (or butyl acetate) as a binder are simultaneously applied to cold application by means of a double nozzle applicator to the edge of the face plate component of a television tube. After more or less drying the suspensions, the edge of the funnel element of the television tube is brought in aligned contact with the solder glass coated face plate and the assembly is then fired to 840° F. at a rate of 20° F. per minute where it is held for 30 minutes. The bulb is then cooled at about 10° F. per minute until the bulb reaches 640° F. where it is held for about 15 minutes so as to minimize thermally induced stresses in the bulb after it has been cooled to room temperature. The so called annealing temperature of V-4 vitreous solder glass is 640° F.

A television bulb in which the face plate and funnel are assembled in the manner described above and which are held together by a bond consisting of a vitreous and a devitrifying solder glass may have the face plate and funnel readily separated later in the event reprocessing is found to be necessary. This is effected by an acid process (see FIGURE 3 or FIGURE 4) in which the television bulb T is rotated (FIG. 4) at from 1 to 4 r.p.m. while floating in an acid A which dissolves out the outer layer of devitrified solder glass leaving an inner layer 5 of vitreous solder glass which holds the face plate 2 and funnel 3 together and also prevents the acid from entering the bulb (see FIGURE 5 and FIGURE 6). Upon removal of the bulb from the acid bath, the application of a slight vacuum or air pressure will crack the remaining vitreous glass seal 5 such that the face plate and funnel may be separated one from the other.

EXAMPLE II

The procedure of Example I is repeated with similar satisfactory results except that the vitreous components of the two component solder glass seal is designated as V-2, described in Table II below.

EXAMPLE III

The procedure of Example I is repeated except the devitrifying sealing glass component of the sealing bond is placed on the inside and the vitreous sealing glass component is on the outside. This reversal of the layers is found particularly desirable where the bulb is to be subject to a high vacuum at high temperatures. If the vitreous sealing component is on the inside, bubbles may form which upon breaking will produce re-entrant angles which are a source of weakness in television bulbs.

The foregoing examples are presented merely as typical illustrations of the process of the present invention, and it is not intended to be limited thereby. It is obvious that various modifications may be made by one skilled in the art without departing from the spirit of the present invention. For example, other organic binders than nitrocellulose in amyl or butyl acetate may be employed provided they satisfactorily suspend the powdered solder glasses and burn out during the firing process. In addition various vitreous and devitrifying solder glasses may be employed in the present process of which the following are representative of those which have been used in the process of making the sealing bonds and composite articles of this invention.

*Table I.—Devitrifying solder glasses*

[Percent by weight]

| Component | D-1 | D-2 | D-3 | D-4 | D-5 |
|---|---|---|---|---|---|
| PbO | 77.6 | 72.7 | 72.7 | 74.7 | 76.7 |
| B₂O₃ | 9.0 | 8.5 | 8.5 | 8.5 | 8.5 |
| ZnO | 10.1 | 10.8 | 12.8 | 12.8 | 12.8 |
| CuO | | 4.0 | | | |
| BaO | | 2.0 | 4.0 | 2.0 | |
| SiO₂ | 2.5 | 2.0 | 2.0 | 2.0 | 2.0 |
| Al₂O₃ | 0.8 | | | | |
| F.S.P.¹, ° F | 706 | 679 | 696 | 678 | 696 |

¹ Fiber softening point.

*Table II.—Vitreous solder glasses*

[Percent by weight]

| Components | V-1 | V-2 | V-3 | V-4 |
|---|---|---|---|---|
| PbO | 71 | 69 | 63 | 71.1 |
| B₂O₃ | 17 | 17 | 16 | 15.4 |
| CuO | 3 | | 3 | 2.0 |
| ZnO | 9 | 9 | 9 | 9.5 |
| CdO | | 3 | 3 | |
| F₂ | | 2 | | |
| BaO | | | 3 | |
| SiO₂ | | | 3 | |
| Al₂O₃ | | | 2 | |
| F.S.P.¹, ° F | 759 | 730 | 832 | 770 |

¹ Fiber softening point.

It will be noted from the fiber softening points, ranging from 678° F. to 832° F., given for the various vitreous and devitrifying solder glasses that the firing temperature, 450° C. or 842° F., will be sufficient to effect the necessary bond between the face plate and funnel glass members which are of such composition as to withstand a firing of 450° C. without any deleterious effect such as glass deformation. Moreover, the firing temperature of 450° C. will also bring about the necessary devitrification of the various devitrifying glass components which begins at temperatures ranging from 327° C. (621° F.) to 402° C. (756° F.).

Other variations which have been employed in this invention include the use of organic binders of differing volatility for the vitreous and devitrifying solder glasses. By using a more volatile solvent, such as du Pont RK–935 as the binder, it has been found that one solder glass layer will dry more quickly than the other which is desirable under certain circumstances.

From the foregoing description it will be evident that there has been devised a composite glass article in which two glass members preferably of the same composition or having similar thermal expansion characteristics are sealed together by means of a sealing glass bond consisting of a devitrifying sealing or solder glass and a vitreous sealing or solder glass. As particularly applied to the bonding of the funnel and face plate of television bulbs, such as bond lends itself to severance by immersion in an acid bath plus the application of slight air (or vacuum) pressure in contrast to the customary heating procedure involving the positioning of an electrical heating element opposite the bond to melt the bond away. Where the bond is a vitreous solder glass only and is melted away, an unexpectedly high breakage occurs in the second evacuation cycle during the course of repressessing the television bulb. Where the bond is a vitreous solder glass only, it has been noted that after melting of the bond it is necessary to remove every trace of the vitreous solder glass remaining on either the funnel element or face plate element prior to resealing the elements together again. In addition the temperatures employed to melt the vitreous glass seal (900° F.) or the devitrified glass seal (990° F.) frequently bring about secondary defects in the funnel or face plate which render them unfit for reprocessing since the glass used in the face plate and funnel do not withstand temperatures above 875° F. very satisfactorily. It therefore becomes self-evident that a seal consisting of devitrifying and vitreous sealing or solder glasses as disclosed in this invention overcomes serious limitations previously noted in either and all vitreous or an all devitrified seal where subsequent reprocessing of the tube is found to be necessary.

Having thus described the new articles of this invention and a process for obtaining the same plus the advantages resulting therefrom, what I claim is:

1. A television bulb comprising a funnel element, a face plate element, and a layer of sealing material between the elements, said sealing material consisting in turn of a first layer of devitrified solder glass and a second layer of vitreous solder glass integrally bonded to each other and to said elements and with each solder glass abutting both funnel and face plate elements.

2. A composite article comprising preformed bodies each having surfaces and a seal between said bodies and integrally adherent to said surfaces, said seal having a first layer of devitrified solder glass and a second layer of vitreous solder glass in parallel alignment and bonded to each other and having each layer in contact with the surfaces of said preformed bodies.

3. The article of claim 2 in which the layer of devitrified solder glass is placed outside with respect to the layer of vitreous solder glass.

4. The article of claim 2 in which the layer of devitrified solder glass is place inside with respect to the layer of vitreous solder glass.

References Cited in the file of this patent

UNITED STATES PATENTS

| | | |
|---|---|---|
| 2,521,048 | Day | Sept. 5, 1950 |
| 2,643,020 | Dalton | June 23, 1953 |
| 2,785,820 | Vincent | Mar. 19, 1957 |
| 2,866,298 | Babcock | Dec. 30, 1958 |
| 2,889,952 | Claypoole | June 9, 1959 |
| 2,936,923 | Veres | May 17, 1960 |